(12) United States Patent
Park et al.

(10) Patent No.: US 12,244,859 B2
(45) Date of Patent: *Mar. 4, 2025

(54) METHOD AND DEVICE FOR DERIVING INTER-VIEW MOTION MERGING CANDIDATE

(71) Applicant: DOLBY LABORATORIES LICENSING CORPORATION, San Francisco, CA (US)

(72) Inventors: Gwang Hoon Park, Seongnam-si (KR); Young Su Heo, Suwon-si (KR)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,186

(22) Filed: May 17, 2023

(65) Prior Publication Data
US 2023/0291931 A1 Sep. 14, 2023

Related U.S. Application Data

(63) Continuation of application No. 16/800,268, filed on Feb. 25, 2020, now Pat. No. 11,729,421, which is a
(Continued)

(30) Foreign Application Priority Data

Mar. 31, 2014 (KR) .................. 10-2014-0038097

(51) Int. Cl.
*H04N 7/12* (2006.01)
*H04N 19/105* (2014.01)
(Continued)

(52) U.S. Cl.
CPC ......... *H04N 19/597* (2014.11); *H04N 19/105* (2014.11); *H04N 19/139* (2014.11);
(Continued)

(58) Field of Classification Search
CPC .. H04N 19/597; H04N 19/105; H04N 19/139; H04N 19/176; H04N 19/521; H04N 19/56; H04N 19/52
(Continued)

(56) References Cited

U.S. PATENT DOCUMENTS 9,936,219 B2  4/2018  Sung et al.
2009/0290643 A1  11/2009  Yang
(Continued)

FOREIGN PATENT DOCUMENTS

CN  1992789 A  7/2007
CN  101473655 A  7/2009
(Continued)

OTHER PUBLICATIONS

Korean Office Action for Application No. 10-2023-0111043, dated Dec. 19, 2023 (8 pages with translation).
(Continued)

*Primary Examiner* — Gims S Philippe
(74) *Attorney, Agent, or Firm* — Michael Best & Friedrich LLP

(57) ABSTRACT

The present invention provides a method and a device for deriving an inter-view motion merging candidate. A method for deriving an inter-view motion merging candidate, according to an embodiment of the present invention, can comprise the steps of: on the basis of encoding information of an inter-view reference block derived by means of a variation vector of a current block, determining whether or not inter-view motion merging of the current block is possible; and, if inter-view motion merging of the current
(Continued)

block is not possible, generating an inter-view motion merging candidate of the current block by using encoding information of an adjacent block that is spatially adjacent to the inter-view reference block.

9 Claims, 7 Drawing Sheets

Related U.S. Application Data continuation of application No. 15/126,028, filed as application No. PCT/KR2015/000450 on Jan. 15, 2015, now Pat. No. 10,616,602.

(51) Int. Cl.
H04N 19/139 (2014.01)
H04N 19/176 (2014.01)
H04N 19/513 (2014.01)
H04N 19/56 (2014.01)
H04N 19/597 (2014.01)

(52) U.S. Cl.
CPC ......... *H04N 19/176* (2014.11); *H04N 19/521* (2014.11); *H04N 19/56* (2014.11)

(58) Field of Classification Search
USPC .................................................. 375/240.02
See application file for complete search history.

(56) References Cited

U.S. PATENT DOCUMENTS

| 2012/0177125 | A1 | 7/2012 | Sugio et al. |
| 2013/0022118 | A1 | 1/2013 | Kim et al. |
| 2013/0308704 | A1 | 11/2013 | Park et al. |
| 2014/0078254 | A1 | 3/2014 | Lin et al. |
| 2014/0341289 | A1 | 11/2014 | Schwarz et al. |
| 2014/0376633 | A1 | 12/2014 | Zhang et al. |
| 2015/0003529 | A1 | 1/2015 | Thirumalai et al. |
| 2015/0085929 | A1* | 3/2015 | Chen ........................ H04N 19/52 375/240.16 |
| 2015/0085930 | A1 | 3/2015 | Zhang et al. |
| 2015/0201212 | A1 | 7/2015 | Zhang et al. |
| 2015/0201216 | A1 | 7/2015 | Lin et al. |
| 2015/0264347 | A1 | 9/2015 | Zhang et al. |
| 2015/0296222 | A1 | 10/2015 | Liin et al. |
| 2015/0358636 | A1 | 12/2015 | Lin et al. |
| 2016/0134857 | A1* | 5/2016 | An ........................ H04N 19/44 348/43 |
| 2016/0165263 | A1* | 6/2016 | Zhang ................... H04N 19/70 375/240.12 |
| 2016/0261888 | A1* | 9/2016 | Nam ................... H04N 19/597 |
| 2016/0295240 | A1* | 10/2016 | Kim ................... H04N 19/119 |
| 2016/0366442 | A1* | 12/2016 | Liu ........................ H04N 19/53 |
| 2017/0006302 | A1* | 1/2017 | Lee ........................ H04N 19/513 |

FOREIGN PATENT DOCUMENTS

| CN | 102387366 A | 3/2012 |
| CN | 102769748 A | 11/2012 |
| CN | 102823248 A | 12/2012 |
| CN | 102946536 A | 2/2013 |
| CN | 103250417 A | 8/2013 |
| EP | 2675169 A2 | 12/2013 |
| KR | 10-2008-0036910 A | 4/2008 |
| KR | 10-2012-0066741 A | 6/2012 |
| KR | 1020130067874 A | 6/2013 |
| KR | 10-2013-0139827 A | 12/2013 |
| KR | 10-2014-0011481 A | 1/2014 |
| WO | 2012/081917 A2 | 6/2012 |
| WO | 2013159326 A1 | 10/2013 |
| WO | 2014005280 A1 | 1/2014 |
| WO | 2015/152504 A1 | 8/2015 |

OTHER PUBLICATIONS

Mora, Elie Gabriel et al., "Modification of the Merge Candidate List for Dependent Views in 3D-HEVC," 2013 IEEE International Conference on Image Processing, IEEE, 2013.

International Search Report issued on Mar. 27, 2015 in corresponding International Patent Application No. PCT/KR2015/000450 (6 pages in English, 6 pages in Korean).

Jung et al., "Temporal MV predictor modification for MV-Comp, Skip, Direct and Merge schemes," Joint Collaborative Team on Video Coding (JCT-VC) of ITU-T SG16 WP3 and ISO/IEC JTC1/SC29/WG11 4th Meeting: Daegu, KR, Jan. 20-28, 2011, JCTVC-D164, 5 pages.

\* cited by examiner

METHOD AND DEVICE FOR DERIVING INTER-VIEW MOTION MERGING CANDIDATE

CROSS-REFERENCE TO RELATED APPLICATIONS

This application is a continuation of U.S. patent application Ser. No. 16/800,268 filed Feb. 25, 2020, which is a continuation of U.S. patent application Ser. No. 15/126,028 filed Sep. 14, 2016, which is a U.S. National Stage Application of International Application No. PCT/KR2015/000450 filed on Jan. 15, 2015, which claims the benefit under 35 USC 119(a) and 365(b) of Korean Patent Application No. 10-2014-0038097 filed on Mar. 31, 2014, in the Korean Intellectual Property Office, the entire disclosures of which are incorporated herein by reference for all purposes.

TECHNICAL FIELD

The present invention generally relates to a method and device for deriving an inter-view motion merge candidate and, more particularly, to a method and device for deriving a motion merge candidate using the encoding information of a reference block so as to derive a motion merge candidate for the current block.

BACKGROUND ART

The International Organization for Standardization (ISO)/International Electrotechnical Commission (IEC) Moving Picture Experts Group (MPEG) and the Telecommunication Standardization Sector of the International Telecommunications Union (ITU-T) Video Coding Experts Group (VCEG) organized a Joint Collaborative Team on Video Coding (JCT-VC) in 2010, and started to develop next-generation video standard technology, known as High Efficiency Video Coding (HEVC), and then completed the development of this technology in January 2013. HEVC enables compression efficiency to be improved by about 50% compared to H.264/AVC High Profile, which was previously known to exhibit the highest compression performance among existing video compression standards.

Meanwhile, three-dimensional (3D) video vividly provides a user with a stereoscopic experience as if he or she were viewing and sensing the real world, through a 3D stereoscopic display device. As research related to this technology, the development of 3D video standards is continually progressed by the Joint Collaborative Team on 3D Video Coding Extension Development (JCT-3V), which is the joint standardization group of ISO/IEC MPEG and VCEG. 3D video standards include both an advanced data format, which may support the playback, etc. not only of stereoscopic video but also of auto-stereoscopic video, using actual video and depth information maps thereof, and technology standards related to the advanced data format.

Further, 3D-HEVC, the standardization of which is under development as a 3D extension of HEVC, may use a motion merge process as a prediction encoding tool. The motion merge process is a method for inheriting motion information, derived from neighboring blocks of the current block, without change, and utilizing the inherited motion information as information about the motion of the current block. The motion merge process in 3D-HEVC is based on HEVC.

Further, 3D-HEVC may use an inter-view motion merge process based on images at multiple views. That is, in 3D-HEVC, motion information may be derived from a block at the position corresponding to that of the current block (hereinafter referred to as a 'reference block') among blocks in neighboring views.

However, 3D-HEVC is problematic in that when motion is uniform, information about the motion of the current block cannot be derived from the reference block, and thus an inter-view motion merge process cannot be used.

Meanwhile, Korean Patent Application Publication No. 10-2013-7027419 (entitled "Method and Apparatus of Motion and Disparity Vector Prediction and Compensation for 3D Video Coding") discloses a method for obtaining a motion vector (MV)/motion vector predictor (MVP) or a disparity vector (DV)/disparity vector predictor (DVP) associated with a skip mode, a merge mode or an inter mode for the block of the current picture in 3D video coding.

DISCLOSURE

Technical Problem

An object of some embodiments of the present invention is intended to allow a reference block to inherit predetermined information, such as motion information, from neighboring blocks that are spatially adjacent to the reference block and to utilize the inherited information for a motion merge process for the current block if the reference block is intra-coded when an inter-view motion merge process for the current block is performed.

However, the technical object intended to be accomplished by the present embodiments is not limited to the above-described technical object, and other technical objects may be present.

Technical Solution

In order to accomplish the above object, a method for generating an inter-view motion merge candidate according to an embodiment of the present invention includes determining whether an inter-view motion merge process is possible for a current block based on encoding information of an inter-view reference block derived through a disparity vector of the current block; and if it is determined that the inter-view motion merge process is impossible for the current block, generating an inter-view motion merge candidate for the current block using encoding information of a neighboring block that is spatially adjacent to the inter-view reference block. Further, a device for generating an inter-view motion merge candidate according to an embodiment of the present invention includes a block search unit for individually acquiring encoding information from an inter-view reference block, derived through a disparity vector of a current block and at least one neighboring block that is spatially adjacent to the reference block, an information analysis unit for determining whether an inter-view motion merge process is possible for the current block based on encoding information of the inter-view reference block, and a candidate generation unit for, if it is determined that the inter-view motion merge process is impossible for the current block, generating an inter-view motion merge candidate for the current block using encoding information of the neighboring block.

In addition, the method for generating an inter-view motion merge candidate may further include, if it is determined that the inter-view motion merge process is possible for the current block, generating an inter-view motion merge candidate for the current block using the encoding information of the inter-view reference block.

Further, determining whether the inter-view motion merge process is possible for the current block based on the encoding information of the inter-view reference block derived through the disparity vector of the current block may be configured to determine whether the inter-view reference block is intra-coded, based on the encoding information of the inter-view reference block.

Furthermore, generating the inter-view motion merge candidate for the current block using encoding information of the neighboring block that is spatially adjacent to the inter-view reference block if it is determined that the inter-view motion merge process is impossible for the current block, may be configured to generate the inter-view motion merge candidate using encoding information of a highly correlated neighboring block that is included in an object region including the reference block, among multiple neighboring blocks that are spatially adjacent to the inter-view reference block.

Furthermore, generating the inter-view motion merge candidate for the current block using encoding information of the neighboring block that is spatially adjacent to the inter-view reference block if it is determined that the inter-view motion merge process is impossible for the current block, may be configured to generate the inter-view motion merge candidate using encoding information of a highly correlated neighboring block that is determined depending on inheritance priority, among multiple neighboring blocks that are spatially adjacent to the inter-view reference block, and the inheritance priority may be preset depending on a sequence of encoding of the inter-view reference block and individual neighboring blocks.

Here, the highly correlated neighboring block may be a neighboring block that is encoded subsequent to the inter-view reference block.

Furthermore, the candidate generation unit may be configured to, if it is determined that the inter-view motion merge process is possible for the current block, generate an inter-view motion merge candidate for the current block using the encoding information of the inter-view reference block.

Furthermore, the information analysis unit may determine whether the inter-view reference block is intra-coded, using the encoding information of the inter-view reference block.

Here, the information analysis unit may perform a determination with reference to a header including a flag that indicates whether the encoding information is used.

Furthermore, the header may be a video parameter set extension.

Furthermore, the encoding information of the reference block may include depth information and motion information of the reference block, and the encoding information of the neighboring block may include depth information and motion information of the neighboring block.

Furthermore, the candidate generation unit may generate the inter-view motion merge candidate using encoding information of a highly correlated neighboring block that is included in an object region including the reference block, among multiple neighboring blocks that are spatially adjacent to the inter-view reference block.

Furthermore, the candidate generation unit may generate the inter-view motion merge candidate using encoding information of a highly correlated neighboring block that is determined depending on inheritance priority, among multiple neighboring blocks that are spatially adjacent to the inter-view reference block, and the inheritance priority is preset in a sequence of the inter-view reference block, a neighboring block encoded subsequent to the inter-view reference block, and a neighboring block encoded prior to the inter-view reference block.

Advantageous Effects

In accordance with the technical solution of the present invention, the present invention uses a method for deriving motion information from the neighboring block of an inter-view reference block when an inter-view motion merge candidate cannot be derived. Therefore, the present invention may improve the encoding efficiency of a motion merge process when 3D video is encoded. Further, the present invention may reduce computation complexity and memory complexity when decoding is performed.

BEST MODE

Figure 1:
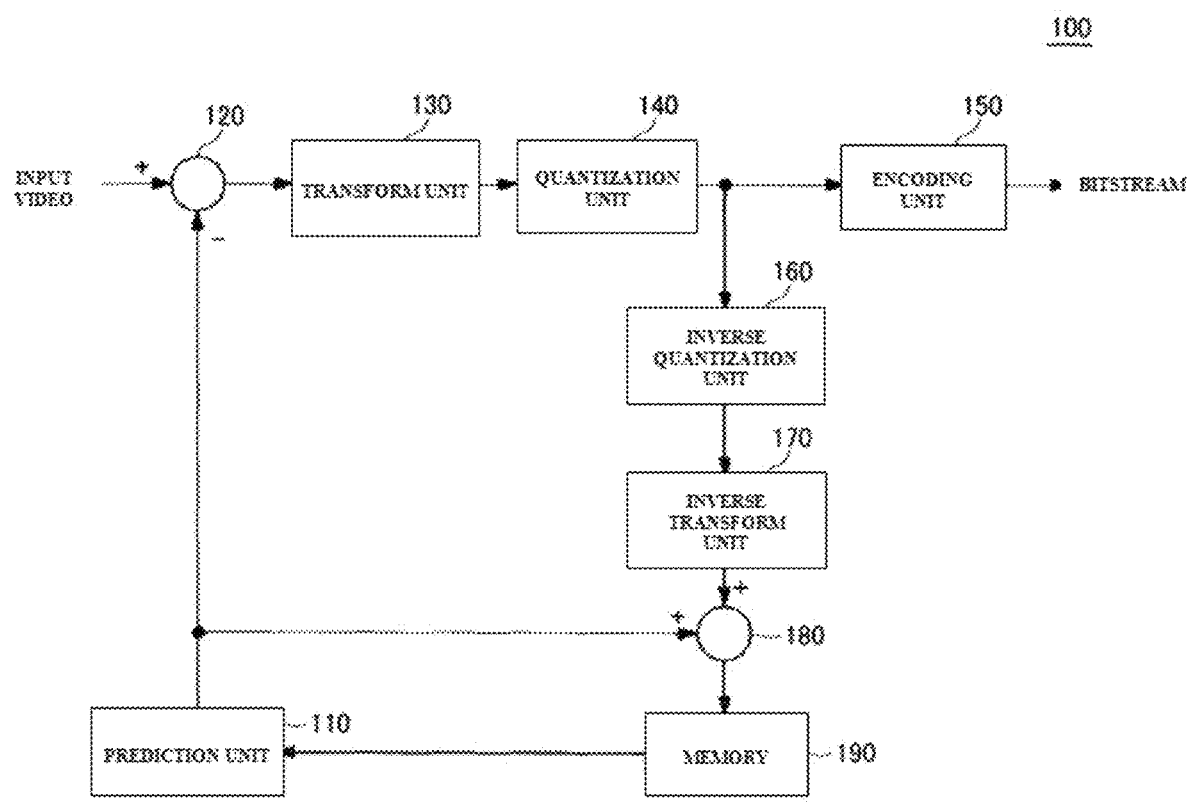
FIG. 1 is a block diagram showing an embodiment of a video encoder.

Embodiments of the present invention are described with reference to the accompanying drawings in order to describe the present invention in detail so that those having ordinary knowledge in the technical field to which the present invention pertains can easily practice the present invention. However, the present invention may be implemented in various forms, and is not limited by the following embodiments. In the drawings, the illustration of components that are not directly related to the present invention will be omitted, for clear description of the present invention, and the same reference numerals are used to designate the same or similar elements throughout the drawings.

Further, throughout the entire specification, it should be understood that a representation indicating that a first component is "connected" to a second component may include the case where the first component is electrically connected to the second component with some other component interposed therebetween, as well as the case where the first component is "directly connected" to the second component. Furthermore, it should be understood that a representation indicating that a first component "includes" a second component means that other components may be further included, without excluding the possibility that other components will be added, unless a description to the contrary is specifically pointed out in context.

Detailed embodiments of the present invention will be described in detail with reference to the attached drawings. However, the spirit of the present invention is not limited to the presented embodiments, and other embodiments may be easily devised via additions, modifications, deletion or insertion of components within the scope of the same spirit as that of the present invention, but it may be understood that the other embodiments may also be included in the scope of the present invention.

Throughout the present specification, a representation indicating that a first component "includes" a second component means that other components may be further included, without excluding the possibility that other components will be added, unless a description to the contrary is specifically pointed out in context. The term "step of performing~" or "step of~" used throughout the present specification does not mean the "step for~".

Hereinafter, preferred embodiments of the present invention will be described in detail with reference to the attached drawings.

Further, all of the methods and devices disclosed in the embodiments of the present invention may be applied both to encoding and decoding procedures performed in a video processing procedure, and the term 'coding' used throughout the present specification is a higher concept including both encoding and decoding procedures. In addition, those skilled in the art may easily understand a decoding procedure with reference to the description of an encoding procedure, and vice versa.

Here, 'encoding' means a procedure for transforming the form or format of video into another form or format for standardization, security, compression, or the like. Further, 'decoding' means a conversion procedure for restoring the form or format of encoded video to its original form or format before being encoded.

Hereinafter, an encoder 100 and a decoder 200 will be described in detail with reference to FIGS. 1 and 2, respectively.

FIG. 1 is a block diagram showing an example of a video encoder 100.

Referring to FIG. 1, the video encoder 100 may include a prediction unit 110, a subtractor 120, a transform unit 130, a quantization unit 140, an encoding unit 150, an inverse quantization unit 160, an inverse transform unit 170, an adder 180, and memory 190.

The prediction unit 110 generates a predicted block by predicting the current block, which is desired to be currently encoded in video. That is, the prediction unit 110 may generate a predicted block having predicted pixel values from the pixel values of respective pixels in the current block depending on motion information that is determined based on motion estimation. Further, the prediction unit 110 may transfer information about a prediction mode to the encoding unit so that the encoding unit 150 encodes information about the prediction mode.

The subtractor 120 may generate a residual block by subtracting the predicted block from the current block.

Further, the transform unit 130 may transform respective pixel values of the residual block into frequency coefficients by transforming the residual block into a frequency domain. For example, the transform unit 130 may transform a video signal in a time domain into a video signal in a frequency domain based on a transform method such as a Hadamard transform or a discrete cosine transform-based transform.

The quantization unit 140 may quantize the residual block transformed into the frequency domain by the transform unit 130.

Further, the encoding unit 150 may encode the quantized residual block based on a coding technique and may then output a bitstream. Here, the coding technique may be an entropy coding technique. Further, the encoding unit 150 may also encode the information about the prediction mode of the current block, transferred from the prediction unit 110, together with the residual block.

The inverse quantization unit 160 may inversely quantize the residual block, which has been quantized by the quantization unit 140. That is, the inverse quantization unit 160 may transform the residual block, which has been transformed into the frequency domain, by inversely quantizing the quantized residual block in the frequency domain.

The inverse transform unit 170 may inversely transform the residual block, which has been inversely quantized by the inverse quantization unit 160. That is, the inverse transform unit 170 may reconstruct the residual block in the frequency domain as a residual block having pixel values. Here, the inverse transform unit 170 may use the transform method performed by the transform unit 130 by inversely performing the transform method.

The adder 180 may reconstruct the current block by adding the predicted block, generated by the prediction unit 110, to the residual block, which has been inversely transformed and reconstructed by the inverse transform unit 170. Further, the reconstructed current block is stored in the memory 190, and the reconstructed current block, which is stored in the memory 190, may be transferred to the prediction unit 110 and may be utilized to predict a subsequent block using the corresponding reference block.

Meanwhile, the video encoder 100 may further include a deblocking filter (not shown). The deblocking filter (not shown) may function to improve the video to realize higher-quality video before storing the current block, reconstructed by the adder 180, in the memory.

Figure 2:
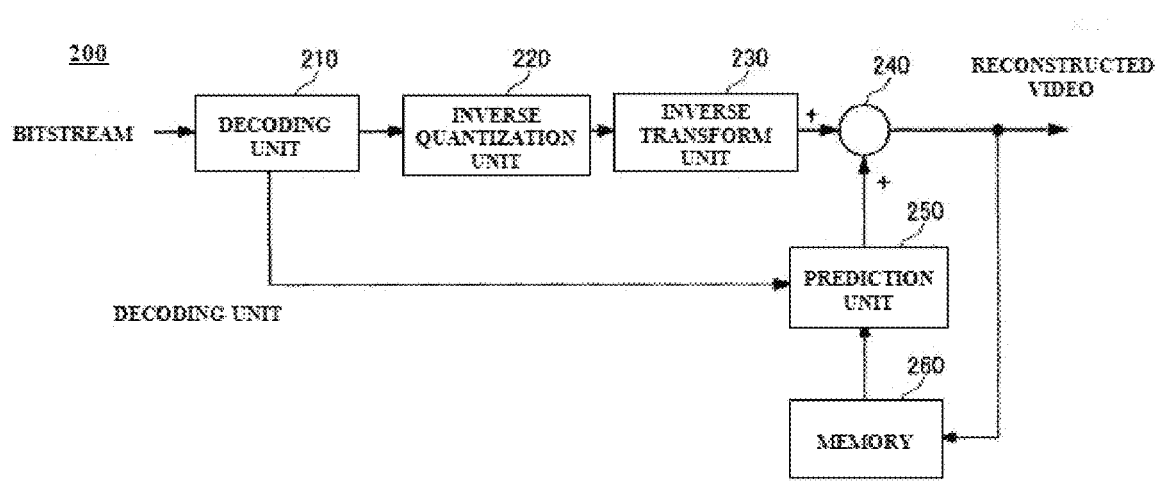
FIG. 2 is a block diagram showing an embodiment of a video decoder.

FIG. 2 is a block diagram showing an example of a video decoder 200.

Referring to FIG. 2, the video decoder 200 may extract a residual block and prediction mode information, which are present before being encoded by the video encoder 100, by decoding a bitstream. The video decoder 200 may include a decoding unit 210, an inverse quantization unit 220, an inverse transform unit 230, an adder 240, a prediction unit 250, and memory 260.

The decoding unit 210 may reconstruct an encoded residual block and encoded motion information for the current block from an input bitstream. That is, the decoding unit 210 may reconstruct a residual block, encoded based on a coding technique, as a quantized residual block. For example, the coding technique used by the decoding unit 210 may be an entropy coding technique.

The inverse quantization unit 220 may inversely quantize the quantized residual block. That is, the inverse quantization unit 220 may reconstruct the quantized residual block as a residual block transformed into the frequency domain by inversely quantizing the quantized residual block.

The inverse transform unit 230 may reconstruct the inversely quantized residual block, reconstructed by the inverse quantization unit 220, as the original residual block by inversely transforming the inversely quantized residual block. Here, the inverse transform unit 230 may perform an inverse transform by inversely performing a transform technique used by the transform unit 130 of the video encoder 100.

The prediction unit 240 may predict the current block and generate a predicted block based on the motion information of the current block, which is extracted from the bitstream and decoded and reconstructed by the decoding unit 210.

The adder 250 may reconstruct the current block by adding the predicted block to the reconstructed residual block. That is, the adder 250 may reconstruct the current block by adding predicted pixel values of the predicted block, which is output from the prediction unit 240, to the residual signal of the reconstructed residual block, which is output from the inverse transform unit 230, and by then obtaining the reconstructed pixel values of the current block.

The current block reconstructed by the adder 250 may be stored in the memory 260. Further, the stored current block may be stored as a reference block and may be used by the prediction unit 240 to predict a subsequent block.

Below, the conventional method for generating an inter-view motion merge candidate will be described in detail with reference to FIG. 3.

Figure 3:
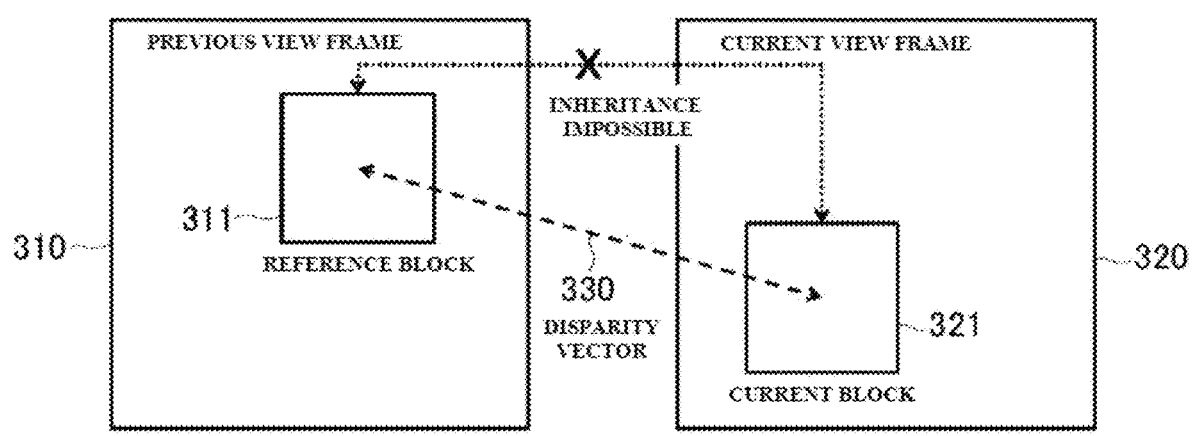
FIG. 3 illustrates the case where the generation of an inter-view motion merge candidate is impossible in the conventional method.

In the conventional method of FIG. 3, the case where the generation of an inter-view motion merge candidate is impossible is illustrated.

Referring to FIG. 3, the conventional method for generating an inter-view motion merge candidate may search for a reference block 311 in a previous view frame 310, corresponding to the current block 321, which is the block desired to be currently encoded in the previous view frame 320, with respect to the current block 321. In this case, the conventional method for generating an inter-view motion merge candidate may use a disparity vector 130 based on a disparity required to correct positions in different view frames. Further, the conventional method for generating an inter-view motion merge candidate may use an inter-view motion merge candidate for the current block 321, inherited from the motion information of the reference block 311.

However, the conventional method for generating an inter-view motion merge candidate cannot inherit motion information from the reference block 311 if the reference block 311 is representatively intra-coded when an inter-view motion merge candidate for the current block 321 is generated. Therefore, the conventional method for generating an inter-view motion merge candidate cannot use an inter-view motion merge method.

Figure 4:
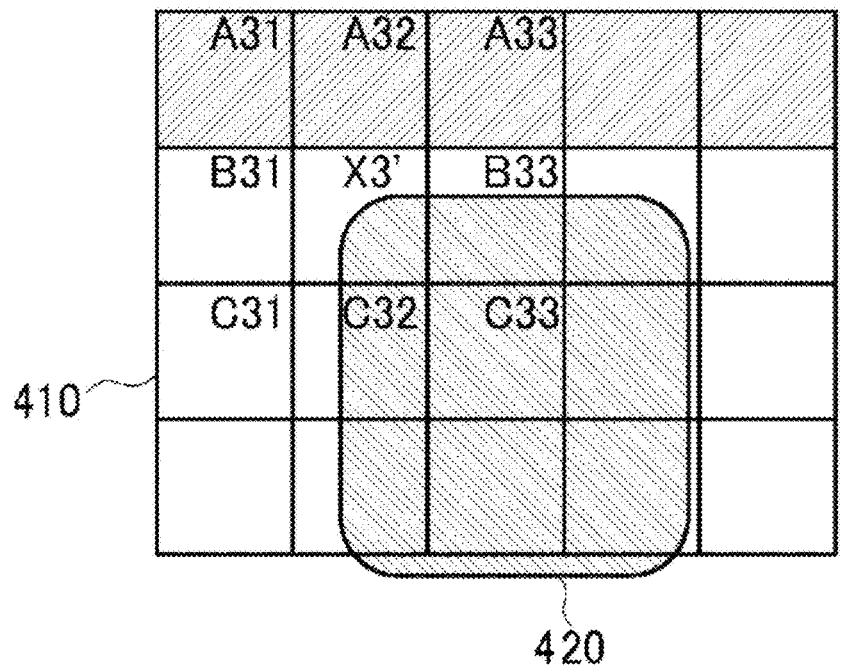
FIG. 4 illustrates an example of an intra-coded block.

Meanwhile, FIG. 4 illustrates an example of an intra-code block.

Referring to FIG. 4, when the current block X2' is encoded, the current block X2' may refer to the encoding information of neighboring blocks, which are spatially adjacent to the current block X2'. In particular, when the current block X2' is encoded, the current block X2' may refer to blocks A21, A22, A23, B21, and C21, which are encoded prior to the current block X2'.

However, in FIG. 4, since the object region to which upper blocks A21, A22, A23, B21, and C21 belong and the object region 420 to which the current block X2' belongs in the corresponding frame 410 are different from each other, the current block X2' of FIG. 4 has a lower correlation with the upper blocks A21, A22, A23, B21, and C21.

As a result, the upper blocks A21, A22, A23, B21, and C21 of FIG. 4 cannot be reference the blocks that may be referred to by the current block X2'. Therefore, the current block X2' is coded in an intra mode.

Here, correlation is a concept identical to the correlation coefficient between two variables in stochastic probability theory. In this regard, correlation may denote the similarity between pixel values in a block in the video processing field.

For example, when the pixel values of the current block are 255, 255, 200, and 200, and a first neighboring block having pixel values of 255, 255, 180, and 200 and a second neighboring block having pixel values of 0, 150, 40, and 50 are present, it may be considered that the current block has a higher correlation with the first neighboring block.

Further, the above-described identical object region may be determined using depth information acquired by a depth camera, but the determination method is not limited thereto.

As described above, in the procedure for generating an inter-view motion merge candidate, even if the reference block is intra-coded and the current block is consequently unable to inherit motion information, the device and method for generating an inter-view motion merge candidate according to the embodiment of the present invention may inherit motion information from any of neighboring blocks of the reference block and perform a motion merge process. Due thereto, the device and method for generating an inter-view motion merge candidate may improve the encoding efficiency of the motion merge process for the current block. Also, the device and method for generating an inter-view motion merge candidate may reduce computation complexity and memory complexity when encoding or decoding is performed.

Here, encoding efficiency may be a value in which the difference in video quality from original video and the bit rate of a compressed video stream are taken into consideration when video is compressed.

Further, the difference in video quality may be determined based on the Peak Signal-to-Noise Ratio (PSNR).

In this case, as the value of the PSNR increases, encoding efficiency improves, and similarly, as the value of the bit rate decreases, encoding efficiency improves.

Hereinafter, a device 500 and method for deriving an inter-view motion merge candidate according to an embodiment of the present invention will be described in detail.

Figure 5:
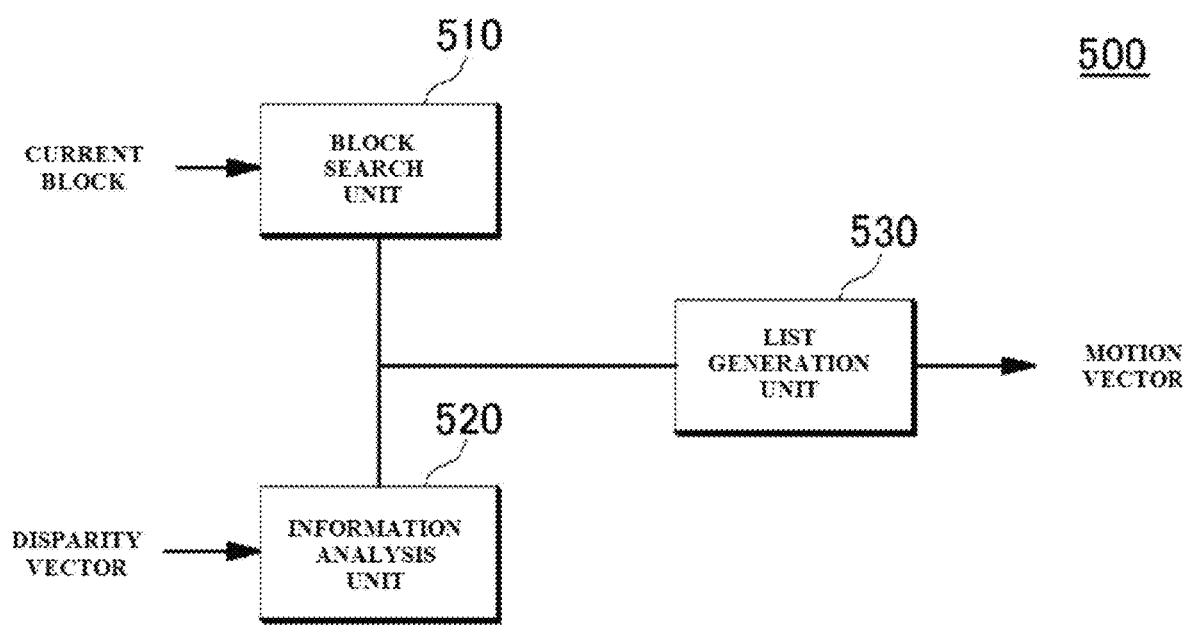
FIG. 5 is a block diagram showing a device for generating an inter-view motion merge candidate according to an embodiment of the present invention.

FIG. 5 is a block diagram showing the device 500 for deriving an inter-view motion merge candidate according to an embodiment of the present invention.

Referring to FIG. 5, the device 500 for deriving an inter-view motion merge candidate according to the embodiment of the present invention may include a block search unit 510, an information analysis unit 520, and a candidate generation unit 530.

The block search unit 510 may individually acquire encoding information from an inter-view reference block, derived through the disparity vector of the current block, and from at least one neighboring block, which is spatially adjacent to the reference block.

The information analysis unit 520 may determine whether an inter-view motion merge process is possible for the current block based on the encoding information of the inter-view reference block.

More specifically, the information analysis unit 520 may determine whether the inter-view reference block is intra-coded, based on the encoding information of the inter-view reference block.

For example, the information analysis unit 520 may perform determination by referring to a header including a flag that indicates whether encoding information is used. Here, the header may be a video parameter set extension. Further, the above-described encoding information of the reference block may include information about the motion and depth of the corresponding reference block.

Further, if it is determined that an inter-view motion merge process is impossible for the current block, the candidate generation unit 530 may generate an inter-view motion merge candidate for the current block using the encoding information of a neighboring block. The encoding information of the neighboring block may include information about the motion and depth of the corresponding neighboring block.

In contrast, if it is determined that the inter-view motion merge process is possible for the current block, the candidate generation unit 530 may generate an inter-view motion merge candidate using the encoding information of the inter-view reference block.

Additionally, the candidate generation unit 530 may generate the inter-view motion merge candidate using the encoding information of a highly correlated neighboring block included in an object region including the inter-view reference block, among multiple neighboring blocks that are spatially adjacent to the inter-view reference block.

That is, in accordance with an example, the highly correlated neighboring block may be determined depending on whether it is included in the object region including the inter-view reference block, and the above-described information may be used when the object region is determined.

Further, the candidate generation unit 530 may generate the candidate using the encoding information of the highly correlated neighboring block that is determined depending on the inheritance priority among multiple neighboring blocks that are spatially adjacent to the inter-view reference block.

Here, the inheritance priority may be preset in the sequence of an inter-view reference block, neighboring blocks that are encoded subsequent to the inter-view reference block, and neighboring blocks that are encoded prior to the inter-view reference block. Further, in accordance with another example, the highly correlated neighboring block may be determined depending on the inheritance priority.

Furthermore, the device 500 for deriving an inter-view motion merge candidate according to the embodiment of the present invention may be included in the video encoder 100, shown in FIG. 1, or the video decoder 200, shown in FIG. 2. As an example, the device 500 for deriving an inter-view motion merge candidate may be installed as a single component in the video encoder 100 or in the video decoder 200. As another example, each component of the device 500 for deriving an inter-view motion merge candidate, or a program for performing the operation of each component, may be included in an existing component of the video encoder 100, such as the prediction unit 110 or the adder 180, or in an existing component of the video decoder 200, such as the prediction unit 250 or the adder 240.

Next, a method for generating an inter-view motion merge candidate according to an embodiment of the present invention will be described in detail with reference to FIGS. 6 to 9.

Figure 6:
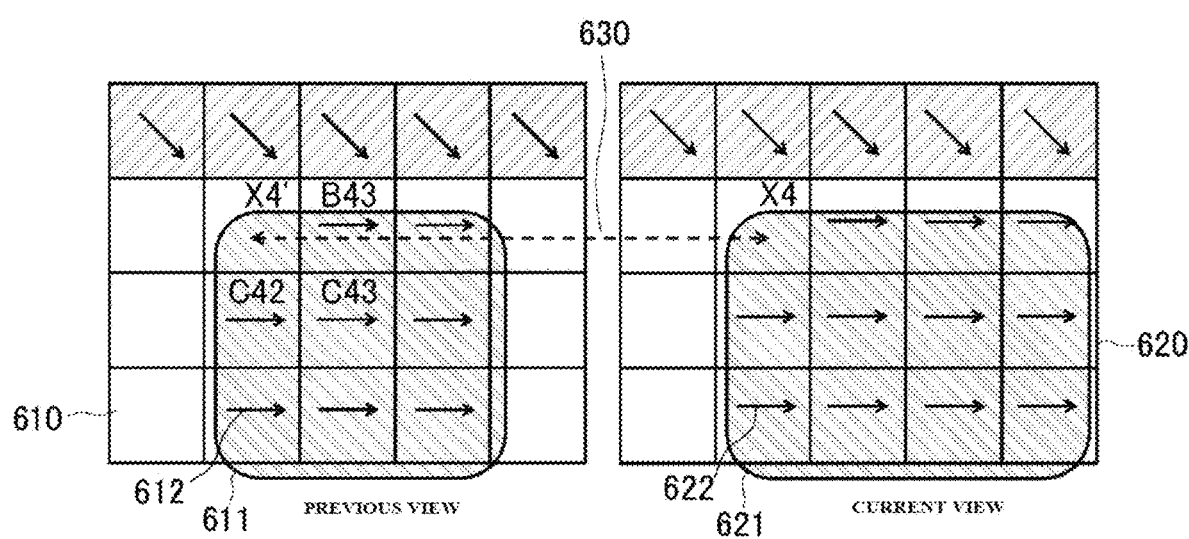
FIG. 6 is a diagram showing the application of a method for generating an inter-view motion merge candidate according to an embodiment of the present invention.

FIG. 6 is a diagram showing the application of the method for generating an inter-view motion merge candidate according to an embodiment of the present invention.

Referring to FIG. 6, when an inter-view motion merge candidate is generated for the current block X4 included in a current view frame 620, if a reference block X4' in a previous view frame 610 is coded in an intra mode, the method for generating an inter-view motion merge candidate may derive motion information of the current block X4 according to the embodiment of the present invention.

Here, the above-described reference block X4' may be the inter-view reference block X4' derived through the disparity vector 630 of the current block X4.

When the reference block X4' in the previous view frame 610, which corresponds to the current block X4 in the current view frame 620, is coded in an intra mode, motion information is not present in the reference block X4'. Therefore, the conventional method cannot derive inter-view motion information from the reference block X4'.

However, the method for generating an inter-view motion merge candidate may use an inter-view motion merge process even if motion information is not present, as in the case where the reference block X4' is coded in an intra mode.

Further, in the method for generating an inter-view motion merge candidate, blocks B43, C42 and C43, among the blocks, which are encoded subsequent to the reference block X4', belong to the same object as the reference block X4', and then have higher correlation with the motion information of the current block X4.

Therefore, the method for generating an inter-view motion merge candidate cannot derive motion information from the reference block X4'. However, in the method for generating an inter-view motion merge candidate, if the motion information is derived from the blocks (B43, C42, or C43 block), which is encoded after the reference block X4' has been coded in an intra mode, that is, blocks (B43, C42, or C43 block) having higher correlation with the reference block, among neighboring blocks that are spatially adjacent to the reference block X4', inter-view motion merge candidates having high encoding efficiency may be used when inter-view motion merge candidates are generated.

Figure 7:
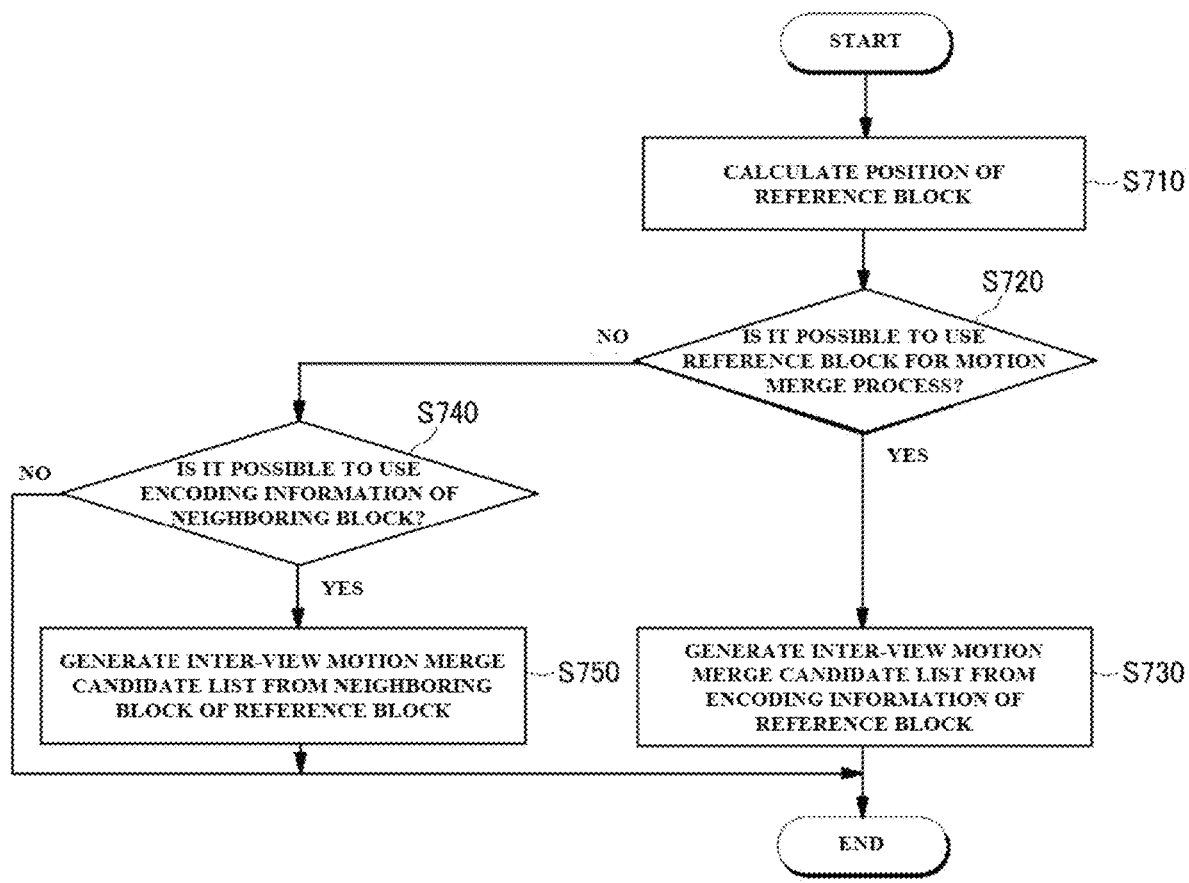
FIG. 7 is a flowchart showing a method for generating an inter-view motion merge candidate according to an embodiment of the present invention.

FIG. 7 is a flowchart showing a method for generating an inter-view motion merge candidate according to an embodiment of the present invention.

Referring to FIG. 7, the method for deriving an inter-view motion merge candidate according to the embodiment of the present invention may determine whether an inter-view motion merge process is possible for the current block based on the encoding information of an inter-view reference block, derived through the disparity vector of the current block at the current view (S720). Further, if it is determined that the inter-view motion merge process is impossible for the current block, the method for generating an inter-view motion merge candidate may generate an inter-view motion merge candidate for the current block using the encoding information of a neighboring block that is spatially adjacent to the inter-view reference block (S750).

Further, the method for deriving an inter-view motion merge candidate may calculate the position of the reference block in a previous view, corresponding to the current block, using the disparity vector of the current block in the current view (S10).

In contrast, if it is determined that the inter-view motion merge process is possible for the current block, an inter-view motion merge candidate for the current block may be generated using the encoding information of the inter-view reference block (S730).

For example, the method for deriving an inter-view motion merge candidate may determine whether the inter-view reference block is intra-coded, based on the encoding information of the inter-view reference block, in order to determine whether the inter-view motion merge process is possible for the current block based on the encoding information of the inter-view reference block, derived through the disparity vector of the current block (S720).

Further, the method for deriving an inter-view motion merge candidate may determine whether the inter-view motion merge process is possible for the current block based on the encoding information of the inter-view reference block, derived through the disparity vector of the current block, and may determine whether the encoding information of a neighboring block is usable if it is impossible to use the reference block for the motion merge process (S740).

Figure 8:
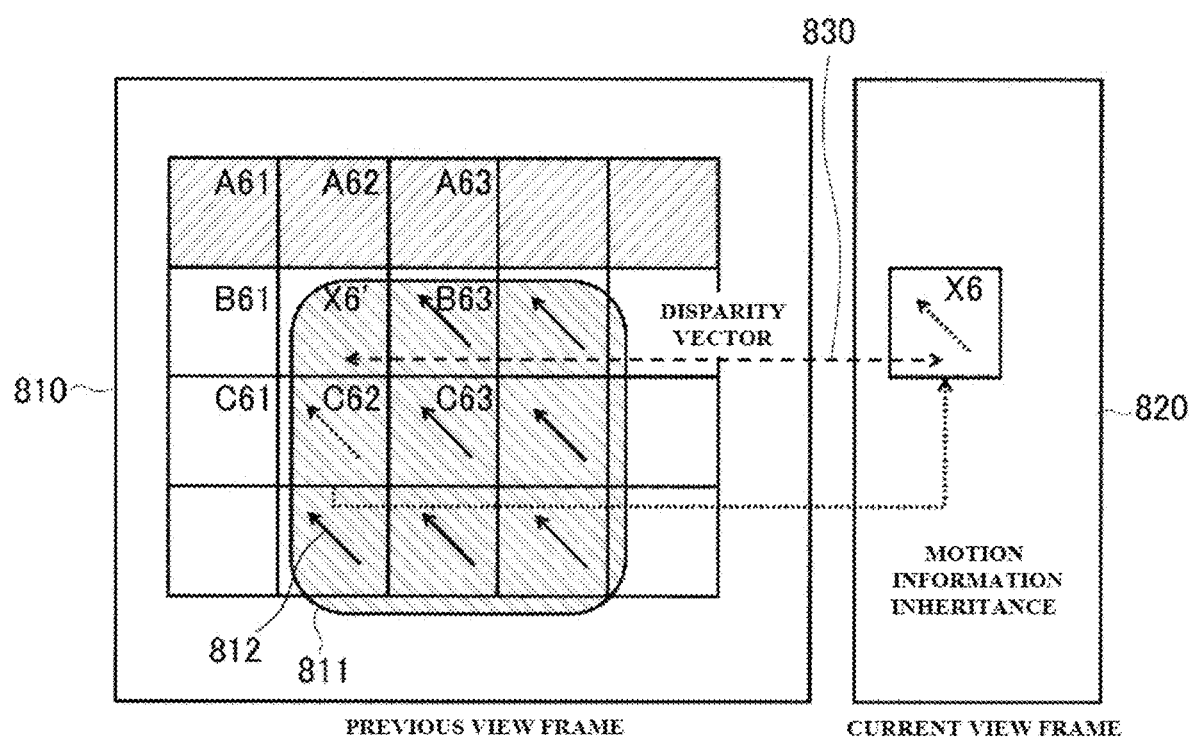
FIG. 8 is a diagram showing the application of a method for generating an inter-view motion merge candidate according to another embodiment of the present invention.

FIG. 8 illustrates a method for generating an inter-view motion merge candidate according to another embodiment of the present invention.

Referring to FIG. 8, when an inter-view motion merge candidate is generated for the current block X6, which is included in a current view frame 820, if a reference block X6' in a previous view frame 810 is coded in an intra mode, the method for generating an inter-view motion merge candidate according to the embodiment of the present invention may derive motion information of the current block X6.

Here, in the method for generating an inter-view motion merge candidate, when the inter-view motion merge candidate is generated for the current block X6, the reference block X6', corresponding to the current block X6, may be coded in an intra mode.

In this case, high priority may be assigned to blocks B63, C62, and C63, which are encoded after the reference block X6' has been encoded, among neighboring blocks that are spatially adjacent to the reference block X6'.

Here, the above-described reference block X6' may be an inter-view reference block derived through the disparity vector 830 of the current block X6, and arrows 812, indicated in respective blocks, may denote pieces of motion information included in the above-described blocks, respectively.

A region 811 that is additionally shaded may be an object region identified using predetermined information. For example, the predetermined information may be depth information input by a depth camera.

Figure 9:
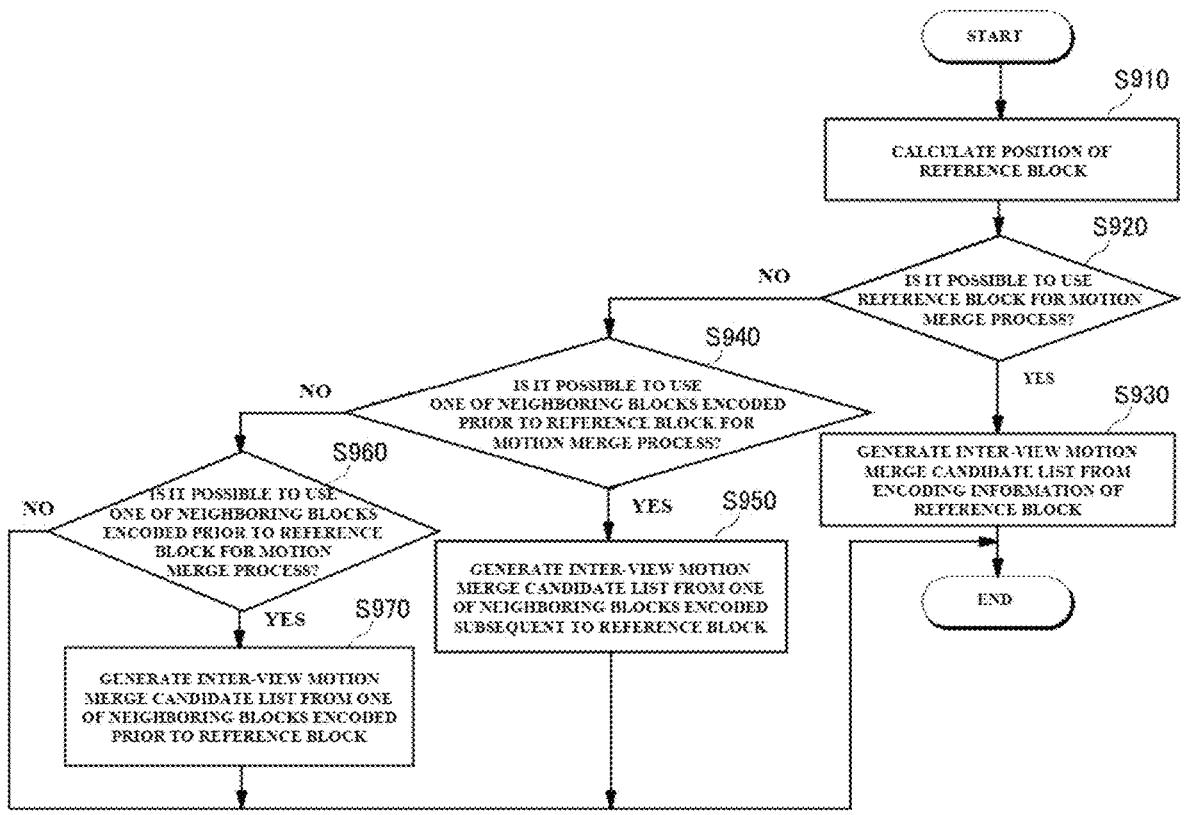
FIG. 9 is a flowchart showing a method for generating an inter-view motion merge candidate according to another embodiment of the present invention.

FIG. 9 is a flowchart showing a method for generating an inter-view motion merge candidate according to another embodiment of the present invention.

Referring to FIG. 9, the method for deriving an inter-view motion merge candidate according to another embodiment of the present invention may calculate the position of a reference block at a previous view corresponding to the current block using the disparity vector of the current block at the current view (S910), and may determine whether an inter-view motion merge process is possible for the current block based on coding information of an inter-view reference block derived through the disparity vector of the current block at the current view (S920). Further, if it is determined that the inter-view motion merge process is impossible for the current block, the method for deriving an inter-view motion merge candidate may generate an inter-view motion merge candidate for the current block using coding information of a neighboring block that is spatially adjacent to the inter-view reference block (S950).

Further, the method for deriving an inter-view motion merge candidate may generate an inter-view motion merge candidate for the current block using coding information of the inter-view reference block if it is determined that the inter-view motion merge process is possible for the current block (S930).

For example, in order to determine whether the inter-view motion merge process is possible for the current block based on coding information of the inter-view reference block derived through the disparity vector of the current block (S920), the method for deriving an inter-view motion merge candidate may determine whether the inter-view reference block is intra-coded, based on coding information of the inter-view reference block.

Further, if it is determined that it is impossible to use the reference block for the motion merge process, the method for deriving an inter-view motion merge candidate may determine whether it is possible to use at least one of neighboring blocks that have been encoded subsequent to the reference block for a motion merge process (S940).

Next, if it is determined that it is impossible to use at least one of neighboring blocks that have been encoded subsequent to the reference block for the motion merge process, the method for deriving an inter-view motion merge candidate may determine whether it is possible to use for at least one of neighboring blocks that have been encoded prior to the reference block for the motion merge process (S960).

Here, if it is determined that it is possible to use at least one of neighboring blocks that have been encoded prior to the reference block for the motion merge process, the method for deriving an inter-view motion merge candidate may generate an inter-view motion merge candidate from the neighboring block (S970).

The components included in embodiments of the present invention are not limited to software or hardware, and may be configured to be stored in addressable storage media and to execute on one or more processors.

Therefore, as an example, the components may include components such as software components, object-oriented software components, class components, and task components, processes, functions, attributes, procedures, subroutines, segments of program code, drivers, firmware, microcode, circuitry, data, databases, data structures, tables, arrays, and variables.

The components and functionality provided in the corresponding components may be combined into fewer components, or may be further separated into additional components.

The embodiments of the present invention may also be implemented in the form of storage media including instructions that are executed by a computer, such as program modules executed by the computer. The computer-readable media may be arbitrary available media that can be accessed by the computer, and may include all of volatile and non-volatile media and removable and non-removable media. Further, the computer-readable media may include all of computer storage media and communication media. The computer-storage media include all of volatile and nonvolatile media and removable and non-removable media, which are implemented using any method or technology for storing information, such as computer-readable instructions, data structures, program modules or additional data. The communication media typically include transmission media for computer-readable instructions, data structures, program modules or additional data for modulated data signals, such as carrier waves, or additional transmission mechanisms, and include arbitrary information delivery media.

The above-described method for generating an inter-view motion merge candidate according to the present invention can be implemented as computer-readable code in computer-readable storage media. The computer-readable storage media include all types of storage media in which data that can be interpreted by a computer system is stored. Examples of the computer-readable storage media may include Read-Only Memory (ROM), Random-Access Memory (RAM), magnetic tape, a magnetic disk, flash memory, an optical data storage device, etc. Further, the computer-readable storage media may be distributed across computer systems connected through a computer communication network, and may be stored and executed as code that is readable in a distributed manner.

Although the method and system of the present invention have been described in relation to specific embodiments, the some or all of the components or operations thereof may be implemented using a computer system that has general-purpose hardware architecture.

The description of the present invention is intended for illustration, and those skilled in the art will appreciate that the present invention can be easily modified in other detailed forms without changing the technical spirit or essential features of the present invention. Therefore, the above-described embodiments should be understood as being exemplary rather than restrictive. For example, each component described as a single component may be distributed and practiced, and similarly, components described as being distributed may also be practiced in an integrated form.

The scope of the present invention should be defined by the accompanying claims rather than by the detailed description, and all changes or modifications derived from the meanings and scopes of the claims and equivalents thereof should be construed as being included in the scope of the present invention.

What is claimed is:

1. A method for decoding a picture using a derivation of an inter-view merge candidate, the method comprising:
    deriving an inter-view reference block using a disparity vector of a current block;
    determining whether motion information exists in the inter-view reference block;
    generating an inter-view motion merge candidate for the current block based on whether the motion information exists in the inter-view reference block;
    generating a merge candidate list for the current block using the inter-view motion merge candidate; and
    generating a prediction block for the current block based on the merge candidate list,
    wherein when it is determined that the motion information exists in the inter-view reference block, the inter-view motion merge candidate is generated by using motion information of the inter-view reference block,
    wherein when it is determined that the motion information does not exist in the inter-view reference block, the inter-view motion merge candidate is generated by using motion information of a neighboring block of the inter-view reference block, and
    wherein the neighboring block of the inter-view reference block is fixed to a block located in a center of an object region including the inter-view reference block.

2. The method of claim 1, further comprising determining whether the inter-view reference block is intra-coded, based on the coding information of the inter-view reference block.

3. The method of claim 1, wherein the neighboring block is a neighboring block that is encoded subsequent to the inter-view reference block.

4. A method for encoding a picture using a derivation of an inter-view merge candidate, the method comprising:
    deriving an inter-view reference block using a disparity vector of a current block;
    determining whether motion information exists in the inter-view reference block;
    generating an inter-view motion merge candidate for the current block based on whether the motion information exists in the inter-view reference block;
    generating a merge candidate list for the current block using the inter-view motion merge candidate; and
    generating a prediction block for the current block based on the merge candidate list,
    wherein when it is determined that the motion information exists in the inter-view reference block, the inter-view motion merge candidate is generated by using motion information of the inter-view reference block,
    wherein when it is determined that the motion information does not exist in the inter-view reference block, the inter-view motion merge candidate is generated by using motion information of a neighboring block of the inter-view reference block, and
    wherein the neighboring block of the inter-view reference block is fixed to a block located in a center of an object region including the inter-view reference block.

5. The method of claim 4, further comprising determining whether the inter-view reference block is intra-coded, based on the coding information of the inter-view reference block.

6. The method of claim 4, wherein the neighboring block is a neighboring block that is encoded subsequent to the inter-view reference block.

7. A non-transitory storage medium including a bitstream generated by an image encoding method using inter-view motion merge candidate derivation, the encoding method comprising:
    deriving an inter-view reference block using a disparity vector of a current block;
    determining whether motion information exists in the inter-view reference block;
    generating an inter-view motion merge candidate for the current block based on whether the motion information exists in the inter-view reference block;
    generating a merge candidate list for the current block using the inter-view motion merge candidate; and
    generating a prediction block for the current block based on the merge candidate list,
    wherein when it is determined that the motion information exists in the inter-view reference block, the inter-view motion merge candidate is generated by using motion information of the inter-view reference block,
    wherein when it is determined that the motion information does not exist in the inter-view reference block, the inter-view motion merge candidate is generated by using motion information of a neighboring block of the inter-view reference block, and
    wherein the neighboring block of the inter-view reference block is fixed to a block located in a center of an object region including the inter-view reference block.

8. The non-transitory storage medium of claim 7, wherein the method for encoding the further determining whether the inter-view reference block is intra-coded, based on the coding information of the inter-view reference block.

9. The non-transitory storage medium of claim 7, wherein the neighboring block is a neighboring block that is encoded subsequent to the inter-view reference block.

* * * * *